US006635718B2

(12) United States Patent
Belt et al.

(10) Patent No.: US 6,635,718 B2
(45) Date of Patent: Oct. 21, 2003

(54) PROCESS FOR THE PREPARATION OF A HYDROGENATED POLYMER COMPOSED OF DIENE MONOMER UNITS AND MONOMER UNITS CONTAINING A NITRILE GROUP

(75) Inventors: Johannes Wilhelmus Belt, Geleen (NL); Marcus Matheus Driessen, Maasbracht (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 10/205,500

(22) Filed: Jul. 26, 2002

(65) Prior Publication Data

US 2003/0036607 A1 Feb. 20, 2003

Related U.S. Application Data

(63) Continuation of application No. PCT/NL01/00016, filed on Jan. 11, 2001.

(30) Foreign Application Priority Data

Jan. 27, 2000 (NL) ............................................. 1014197

(51) Int. Cl.$^7$ ................................................ C08C 19/02
(52) U.S. Cl. .................... 525/329.3; 525/339; 525/338; 524/565
(58) Field of Search .............................. 525/329.3, 339, 525/338; 524/565

(56) References Cited

U.S. PATENT DOCUMENTS

| 4,452,950 A | | 6/1984 | Wideman |
| 5,442,009 A | * | 8/1995 | Parker et al. ................ 524/555 |
| 2002/0091202 A1 | * | 7/2002 | Belt et al. ................. 525/329.3 |

* cited by examiner

*Primary Examiner*—D. R. Wilson
(74) *Attorney, Agent, or Firm*—Pillsbury Winthrop LLP

(57) ABSTRACT

Process for the preparation of a hydrogenated polymer composed of conjugated diene monomer units and monomer units containing a nitrile group, wherein the hydrogenation is carried out in the presence of hydrazine, an oxidizing compound and a metal compound as catalyst, a metal compound containing a metal atom in an oxidation state of at least 4 being used as catalyst.

10 Claims, No Drawings

PROCESS FOR THE PREPARATION OF A HYDROGENATED POLYMER COMPOSED OF DIENE MONOMER UNITS AND MONOMER UNITS CONTAINING A NITRILE GROUP

This application is a continuation of PCT/NL01/00016, filed Jan. 11, 2001, which designated the United States.

The invention relates to a process for the preparation of a hydrogenated polymer composed of conjugated diene monomer units and monomer units containing a nitrile group, wherein the hydrogenation is carried out in the presence of hydrazine, an oxidizing compound and a metal compound as catalyst.

In polymers composed of conjugated diene monomer units and monomer units containing a nitrile group, such as for instance nitrile butadiene rubber (NBR), the double bonds in the polymer chain can wholly or partially be hydrogenated. Upon such hydrogenation the polymers are for instance less sensitive to oxidative degradation at elevated temperature and the polymers can be used for instance for automotive applications, under the bonnet or even in the engine block.

The existing commercial processes for the hydrogenation of such polymers are laborious and costly. Thus, NBR is dissolved in a suitable medium and then, in the presence of a noble metal as catalyst, hydrogenated with hydrogen at elevated pressure and temperature. Next, the catalyst and the solvent have to be extracted in a separate process step.

Moreover, upon attainment of high degrees of hydrogenation, side reactions will occur, resulting in unwanted branching of the polymer or even gelation.

From U.S. Pat. No. 4,452,950 it is known to hydrogenate NBR in the form of an aqueous dispersion in the presence of hydrazine, an oxidizing compound and a metal compound as catalyst. After the polymerization NBR as such is mostly already available as an aqueous dispersion in the form of a latex. It is also possible to make an aqueous dispersion of the polymer. The catalyst used is a metal compound of copper or iron for instance.

This does as such yield a simplified process for the hydrogenation, but this process as well comes with the drawback that during the hydrogenation reaction side reactions take place in the hydrogenated polymer which at least result in unwanted branching of the polymer, but mostly even give rise to unwanted gelation. This entails for instance changes in the rheological properties of the hydrogenated polymer in an uncontrolled and non-reproducible way, which has adverse effects on the further compounding and processing of the polymer. It may even occur that the hydrogenated polymer has gelated to such an extent that the polymer cannot be processed at all any more to mouldings.

The aim of the present invention is to provide a process whereby said drawbacks are eliminated completely or to a high extent.

Said aim is surprisingly achieved by using as catalyst a metal compound containing a metal atom in an oxidation state of at least 4.

In the process according to the invention the side reactions are at least strongly suppressed compared with the known process, or even absent.

A further advantage of the process according to the invention is that good results are achieved when the hydrazine and the oxidizing compound are present in only a slight excess or even in equimolar amounts, relative to the double bonds of the polymer which are to be hydrogenated.

In addition, the reaction is catalysed so well that a heating step can be omitted, which means a significant simplification of the hydrogenation process.

The cross-linking of the latex during the hydrogenation process, as described in U.S. Pat. No. 4,452,950 is known from U.S. Pat. No. 5,039,737 and U.S. Pat. No. 5,442,009. In the two latter patents a process is described whereby the gel structures are broken up again by means of an after treatment.

From patent specification WO 91/06579 it is known to carry out a hydrogenation in the presence of a catalyst. However, in this process a high hydrazine to polymer molar ratio is used in order to obtain a non-cross-linked polymer. The excess of hydrazine subsequently has to be worked up or destroyed, which is costly in an economic sense and unacceptable from a viewpoint of environmental protection.

The unsaturated polymers which can be hydrogenated by the process according to the invention contain for instance 5–95 wt. % of the conjugated diene monomer unit and 95–5 wt. % of the monomer unit containing a nitrile group. The polymer preferably contains 50–80 wt. % of the conjugated diene monomer unit and 20–50 wt. % of the monomer unit containing a nitrile group. Even more preferably the polymer contains 60–70 wt. % of the conjugated diene monomer unit and 30–40 wt. % of the monomer unit containing a nitrile group. Specific examples of the conjugated diene monomer units are 1,3- butadiene, 2,3-dimethyl butadiene, isoprene and 1,3-pentadiene. Preferably 1,3-butadiene is used. Specific examples of monomer units containing a nitrile group are acrylonitrile and methacrylonitrile. Preferably acrylonitrile is used.

By preference, NBR is used as polymer in the process according to the invention.

The polymers that are used in the process according to the invention can be prepared by various methods, for instance by means of emulsion polymerization, solution polymerization and mass polymerization. The polymers are preferably prepared by means of emulsion polymerisation because this yields the polymer directly in the form of a latex.

The polymers are preferably present in the form of a latex during the hydrogenation. The latex is an aqueous emulsion of the polymer, with all kinds of additives being optionally present, such as for instance soap and stabilizers. The type of latex that is suitable for instance for the hydrogenation of unsaturated polymers by the process according to the invention is described in U.S. Pat. No. 5,442,009.

The polymer content of the latex lies for instance in the range from 1 to 70 wt. %, preferably between 5 and 40 wt. %.

It is possible for hydrazine to be present in the process according to the invention because it has been added as such. It is also possible that a hydrazine-releasing compound such as for instance hydrazine hydrates, hydrazine acetate, hydrazine sulphate and hydrazine hydrochloride has been added. Preferably use is made of hydrazine and hydrazine hydrate if the hydrogenation of the unsaturated polymer is carried out in latex.

Hydrazine is present for instance in a molar ratio of 0,1:1 to 100:1, relative to the double bonds in the polymer chain. This ratio is preferably between 0,8:1 and 5:1, most preferably between 0,9:1 and 2:1.

Oxidizing compounds that are suitable for the process according to the invention are for instance air, oxygen, ozone, peroxides, hydroperoxides, iodine, iodates, hypochlorite and similar compounds. Particularly suitable compounds are chosen from the group comprising peroxides and hydroperoxides. Most preferably, use is made of hydrogen peroxide.

The oxidizing compound is present in the polymer chain in a molar ratio of between 0,1:1 and 100:1 relative to the double bonds. Preferably this ratio is between 0,8:1 and 5:1, most preferably between 0,9:1 and 2:1.

Examples of suitable compounds to be used as catalysts in the process according to the invention are compounds which contain a titanium atom in oxidation state 4 (Ti (IV)), a vanadium atom in oxidation state 5 (V (V)), a molybdenum atom in oxidation state 6 (Mo (VI)) or a tungsten atom in oxidation state 6 (W (VI)). Preferably, the catalyst used is a compound which contains the W (VI) atom. More preferably, a salt of tungstic acid is used. Most preferably, a sodium or potassium salt of tungstic acid is used.

The molar ratio of the catalyst to the double bonds in the polymer chain lies between 1:1000 and 10:1; preferably the ratio lies between 1:50 and 1:2.

The sequence of addition of the compounds for the hydrogenation reaction can in principle be chosen freely. Preferably, however, the oxidizing compound is added to the reaction mixture after the hydrazine, in such a way that the concentration of the oxidizing compound remains low when the hydrogenation reaction takes place.

The hydrogenation reaction can be carried out batchwise as well as continuously. Closed or open vessels can be used.

It is possible for the amount of double bonds to be hydrogenated to represent only part of the total amount of double bonds present in the polymer chain.

The hydrogenation degree is equal to (A/B)×100%, where A is the amount of double bonds that has been saturated as a result of the hydrogenation reaction and B is the original amount of double bonds. The process according to the present invention yields polymers which have a hydrogenation degree of for instance more than 60%. The hydrogenation degree preferably is higher than 80%. The process is eminently suitable for the preparation of polymers having a hydrogenation degree of more than 80%.

The hydrogenation reaction temperature lies between 0° C. and 250° C.; preferably it lies between 20° C. and 150° C.; more preferably it lies between 30° C. and 80° C.

During the hydrogenation in a latex a small amount of solvent for the unsaturated polymer can be present. The amount of such a solvent can vary for instance between 0 and 20 wt % (solvent relative to polymer).

The duration of the hydrogenation varies for instance from 1 minute to 24 hours. The hydrogenation time preferably lies between 1 hour and 12 hours.

The process according to the invention will be elaborated in the following in a number of examples, without however being restricted thereto.

The degree of hydrogenation was in practically all cases determined by means of $^1$H-NMR on a Bruker 200 MHz apparatus. The measurements were carried out on a precipitated polymer, dissolved in deuterated chloroform. The degree of hydrogenation was calculated from the integral ratio of the olefinic protons between 5.2 and 5.6 ppm to the proton next to the nitrile group lying between 2.35 and 2.65 ppm.

EXAMPLE 1

0.006 g $Na_2WO_4.2H_2O$ (the hydrate of the sodium salt of tungstic acid) and 6.31 g $N_2H_4.1H_2O$ (hydrazine monohydrate, 126 mmol) in 5.5 g water were added to 25 g latex of Nysin® 33/3 (a copolymer of 67% butadiene and 33% acrylonitrile, with a total of 77.5 mmol carbon-carbon double bonds) with a polymer content of 25 wt % in a 250 ml glass three-neck flask provided with a glass top stirrer, a cooler and a hose pump. A few drops of silicone oil were added as antifoaming agent.

The latex was heated to 40° C. and stirred for a few minutes. With stirring, 13.30 g 30% $H_2O_2$ solution in water (117 mmol) were added dropwise in 6 hours with the hose pump. Upon hydrogenation the 5 g of latex was poured out in 50 g isopropanol. The polymer dissolved completely (visually no gel parts) in chloroform. The degree of hydrogenation determined with $^1$H-NMR was 88%.

Comparative Experiment A 4.3 g $N_2H_4.1H_2O$ (hydrazine monohydrate, 1.1 equivalent relative to C=C), followed by 0.0018 g CuSO4.5H2O in 5 g water, were added to 25 g latex of Nysin® 33/3 with a polymer content of 25 wt % in a 250 ml glass three-neck flask provided with a glass top stirrer, a cooler and a hose pump. A few drops of silicone oil were added as antifoaming agent.

The latex was heated to 40° C. and stirred for a few minutes. With stirring, 10 g 30% $H_2O_2$ solution in water were added dropwise in 6 hours with the hose pump. During the hydrogenation, samples of 1 g latex were taken and precipitated in 10 g isopropanol. The solubility of the polymer was determined visually directly in chloroform. The results are shown in table 1.

TABLE 1

Solubility as a function of added $H_2O_2$ and degree of hydrogenation Comparative Experiment

| Exp. | Added $H_2O_2$ % | Degree of hydrogenation % | Solubility |
| --- | --- | --- | --- |
| A.1 | 13 | 14 | Soluble |
| A.2 | 33 | 28 | Soluble |
| A.3 | 47 | — | Cross-linked |
| A.4 | 100 | 71 | Cross-linked |

The polymers of experiments A.3 and A.4 were subjected to a Soxhlet extraction with chloroform with which the gel content was determined. The sample from experiment A.3 contained 70% gel and the sample from experiment A.4 more than 90%. The degree of hydrogenation of the sample in experiment A.4 was determined with Raman spectrometry.

From experiment (I) and comparative experiment A it appears that with the process according to the invention there is no gel formation at a high degree of hydrogenation, while with the known process gel formation already occurs at a relatively low degree of hydrogenation.

What is claimed is:

1. Process for the preparation of a hydrogenated polymer composed of conjugated diene monomer units and monomer units containing a nitrile group, wherein the hydrogenation is carried out in the presence of hydrazine, an oxidizing compound and a metal compound as catalyst, characterized in that a metal compound containing a metal atom in an oxidation state of at least 4 is used as catalyst.

2. Process according to claim 1, characterized in that NBR is used as polymer.

3. Process according to claim 1, characterized in that the catalyst used is a metal compound containing Ti (IV), V (V), Mo (VI) or W (VI) as metal atom.

4. Process according to claim 1, characterized in that the catalyst used is a metal compound containing W (VI) as metal atom.

5. Process according to claim 4, characterized in that a salt of tungstic acid is used as catalyst.

6. Process according to claims 1, characterized in that the hydrazine/double bonds molar ratio in the polymer lies between 0.9:1 and 2:1.

7. Process according to claim 1, characterized in that the oxidizing compound/double bonds molar ratio lies between 0,9:1 and 2:1.

8. Process according to claim 1, characterized in that the oxidizing compound is added to the reaction mixture after the hydrazine.

9. Process according to claim 1, characterized in that the polymer is present in the form of a latex.

10. Process according to claim 1, characterized in that the oxidizing substance is hydrogen peroxide.

* * * * *